(12) United States Patent
Nishimura

(10) Patent No.: US 7,082,238 B2
(45) Date of Patent: Jul. 25, 2006

(54) SELF-ALIGNING OPTICAL INTERCONNECT UTILIZING CONFORMAL MATERIALS

(75) Inventor: Ken A. Nishimura, Fremont, CA (US)

(73) Assignee: Avago Technologies, Singapore (SG)

( * ) Notice: Subject to any disclaimer, the term of this patent is extended or adjusted under 35 U.S.C. 154(b) by 240 days.

(21) Appl. No.: 10/101,824

(22) Filed: Mar. 19, 2002

(65) Prior Publication Data
US 2003/0180002 A1   Sep. 25, 2003

(51) Int. Cl.
  *G02B 6/26* (2006.01)
  *G02B 6/42* (2006.01)
(52) U.S. Cl. .................. 385/48; 385/39; 385/44; 385/50; 385/52
(58) Field of Classification Search ............ 385/48, 385/39, 31, 44, 47, 52, 50, 34
See application file for complete search history.

(56) References Cited

U.S. PATENT DOCUMENTS

| 4,165,496 | A | * | 8/1979 | Di Domenico et al. ....... 372/31 |
| 5,305,401 | A | * | 4/1994 | Becker et al. ................. 385/24 |
| 5,333,227 | A | * | 7/1994 | Ishiharada et al. .......... 385/100 |
| 5,980,312 | A |   | 11/1999 | Chapman et al. |
| 5,999,670 | A | * | 12/1999 | Yoshimura et al. ........... 385/31 |
| 6,021,247 | A | * | 2/2000 | Helble ........................ 385/147 |
| 6,314,115 | B1 | * | 11/2001 | Delfyett et al. ................. 372/6 |
| 6,370,292 | B1 | * | 4/2002 | Strake .......................... 385/14 |
| 2003/0174965 | A1 | * | 9/2003 | Nishimura .................... 385/50 |

FOREIGN PATENT DOCUMENTS

| JP | 6-34834 A | * | 2/1994 |
| JP | 11-52184 A | * | 2/1999 |

* cited by examiner

*Primary Examiner*—Jared J. Fureman

(57) ABSTRACT

An optical waveguide such as an optical fiber extends across a semi-rigid substrate or optical back plane and is made of conformal materials having indices of refraction selected to provide substantially total internal reflection of light transmitted within a core. An optical pin is made of substantially rigid optically transmissive materials. A receptacle in the substrate or optical backplane removably receives and holds the optical pin to allow a beveled terminal end of the pin to penetrate the core of the optical fiber to establish a gap-less interface that provides an optical path between the core and the pin.

21 Claims, 2 Drawing Sheets

SELF-ALIGNING OPTICAL INTERCONNECT UTILIZING CONFORMAL MATERIALS

FIELD OF THE INVENTION

The present invention relates to fiber optics, and more particularly, to interconnection devices used to join an optical fiber to another optical fiber or to a fiber optic component.

BACKGROUND OF THE INVENTION

Fiber optic connectors have long been used to join an optical fiber to another optical fiber or to a fiber optic component such as a light emitter, a light detector or an optical switch. Exemplary light emitters include laser diodes and light-emitting diodes. Exemplary light detectors include PIN photodiodes, integrated detector/pre-amplifiers (IDPs), and avalanche photodiodes (APDs).

Fiber optic connectors for connecting individual fiber optic fibers have been widely commercialized and typically include an alignment sleeve. Many connector devices have also been developed for physically mating the parallel faces of a bundle of fiber optic fibers. Simple mechanical splices have also been used, such as a capillary splice, fusion splice or epoxy connection. These types of fiber optic connectors all add loss to the fiber optic communication system to which they belong.

Simple fiber optic connectors and splices join two fiber ends together. By way of contrast, other types of passive fiber optic coupling devices are used where three or more optical fibers are to be joined. Fiber optic couplers split optical signals into multiple paths or vice versa. Splitters, tap ports, switches, wave guides, and wave-length-division multiplexers (WDMs) are also used to divide or combine multiple optical signals.

An optical signal consisting of a flow of photons is similar to an electrical signal in some respects. However, an optical signal does not flow through a receiver to ground. Instead, an optical signal flows to a detector where it is absorbed. If multiple fiber optic receivers were connected in series, no optical signal would reach beyond the first receiver. Therefore, multiple optical ports must generally be parallel and allowances must be made for reduction in optical signal strength due to signal division and attenuation losses that result from refraction index differentials, fiber end misalignments, spacing between fiber ends, and imperfections in the fibers at the junctions.

In the telecommunications industry, large numbers of fiber optic communication modules with fiber optic inputs and/or outputs are frequently removably mounted in vertical enclosures or racks. These enclosures or racks sometimes have common vertical backplanes into which the fiber optic communication modules, such as routers, are plugged. The fiber optic communication modules are designed to be rapidly removed and replaced to facilitate repairs and upgrades and minimize any negative impacts on the speed, capacity and/or reliability of the overall telecommunications system. Quite clearly it is necessary to provide some means for physically supporting many parallel fiber optic fibers leading to such rack-mounted fiber optic communication modules while at the same time ensuring accurate mating of the ends of the fibers with a minimum of signal losses. Simply using a conventional fiber optic connector for each optical fiber is undesirable due to the expense of such connectors and the relatively large amount of space that is occupied by such connectors. Furthermore, conventional fiber optic connectors usually cannot be rapidly connected and disconnected.

Complex and expensive backplane assemblies have been developed which combine an electrical backplane with a fiber optic backplane. A plurality of individual connector openings are provided in the optical backplane for receiving individual fiber optic connectors that are arranged in rows. See, for example, U.S. Pat. No. 5,980,312 of Chapman et al. Multiple optical fibers have also been mounted in parallel fashion through a supporting planar substrate, but the ends of the fibers must still be individually connected.

Electronic assemblies that utilize components mounted on a conventional circuit board rely on a conformal material to insure electrical contact between the input/output leads of the components with conductive traces or paths on the circuit board. Typically this conformal material is solder, an alloy of tin and lead that becomes liquid when heated to a relatively low temperature. Solder re-flow is thus used to fill any gaps between the component leads and the circuit board traces, while at the same time providing mechanical and electrical interconnections. At ambient temperature, the solder remains solid and provides the required electrical conductivity. Equivalent optical assemblies utilizing conventional optical interconnects require precisely mated optical waveguides to form the optical paths. At present, a low cost automated optical interconnect analog to soldered PC board connections does not exist. Unlike the connection of individual copper wires to a circuit board, the connection of an optical fiber to a fiber optic transmitter or a fiber optic receiver requires tedious, cut, polish and alignment procedures.

SUMMARY OF THE INVENTION

It would therefore be desirable to provide a technique for inserting optical components into an optical backplane and quickly achieving a low-low optical interconnection between the components and the backplane.

In accordance with the present invention, a self-aligning optical interconnect includes a substrate, at least one optical waveguide, and at least one optical pin. The optical waveguide extends across the substrate and is made of conformal materials having indices of refraction selected to provide substantially total internal reflection of light transmitted within a core. The optical pin is made of substantially rigid optically transmissive materials. The substrate has at least one receptacle for removably receiving and holding the optical pin to allow a terminal end of the pin to penetrate the core of the optical waveguide to establish an optical path between the core and the pin.

In accordance with the present invention a novel method of providing an optical interconnect includes the initial step of providing a rigid pin made of optically transmissive materials having indices of refraction that provide substantially total internal reflection, the rigid pin including a terminal end and having a longitudinal axis. The next step of the method involves providing an optical waveguide including a core and a cladding made of conformal materials having indices of refraction selected to provide substantially total internal reflection, the optical waveguide having a longitudinal axis. The next step of the method involves inserting the terminal end of the rigid pin into the optical waveguide with the longitudinal axis of the rigid pin substantially orthogonal to the longitudinal axis of the optical waveguide to form a gap-less interface between the optical waveguide and the rigid pin.

BRIEF DESCRIPTION OF THE DRAWINGS

Throughout the drawing figures, like reference numerals refer to like parts.

DESCRIPTION OF THE PREFERRED EMBODIMENTS

Figure 1:
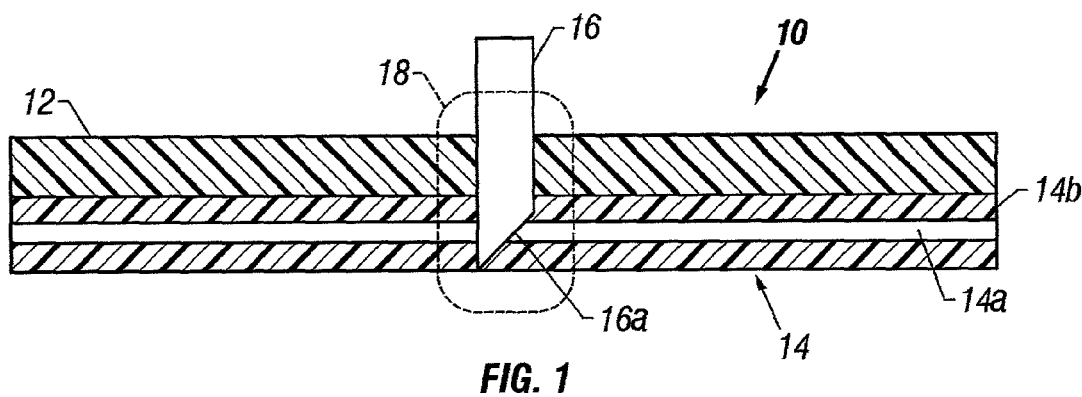
FIG. 1 is a diagrammatic illustration of a self-aligning optical interconnect in accordance with a first embodiment of the present invention.

Referring to FIG. 1, a self-aligning optical interconnect 10 includes a semi-rigid optical backplane 12, at least one optical fiber 14, and at least one cylindrical optical pin 16. The optical fiber 14 extends across the optical back plane 12 and is made of conformal materials having indices of refraction selected to provide substantially total internal reflection of light transmitted within a core 14a surrounded by a cladding 14b. The optical pin 16 is made of substantially rigid optically transmissive materials also having indices of refraction selected to provide substantially total internal reflection. At least one receptacle 18 in the optical backplane 12 removably receives and holds the optical pin 16. The optical pin 16 can be manually or automatically inserted into the receptacle 18 in order to allow a sharp beveled terminal end 16a of the pin 16 to pierce and penetrate the core 14a of the optical fiber 14 to establish a bi-directional optical path between the core 14a and the pin 16. A commercial version of the first embodiment 10 would have many optical fibers 14 extending in spaced apart parallel relationship over one side of the optical back plane 12.

The conformal nature of the optical fiber 14 insures a gap-less interface between the optical fiber 14, which serves as a waveguide, and the optical pin 16. The receptacle 18 can be a cylindrical bore in the backplane 12 dimensioned to snugly receive the optical pin 16 to orient its central axis perpendicular to the central axis of the optical fiber core 14a. Alternatively, the receptacle 18 can be a separate device such as a rigid or conformal sleeve or donut mounted in the bore through the backplane 12. Preferably the receptacle provides the X-Y alignment between the pin 16 and the fiber 14 and allows the pin 16 to pierce the fiber 14 along a direction generally transverse to the longitudinal axis of the fiber 14. Z-axis alignment (penetration depth) can be controlled by forcing the pin 16 through the fiber 14 until the tip of its terminal beveled end strikes a plate or other obstruction (not illustrated) opposite the optical backplane 12. Alternatively the pin 16 can be formed with a rigid collar (not illustrated) that will engage the receptacle 18 and limit the penetration depth of the pin.

The facet formed by the polished beveled terminal end 16a of the pin 16 is angled at forty-five degrees to permit a light beam propagating down the core 14a to enter the optical pin 16 and visa versa. The optical backplane 12 may be made of a suitable polymer material such as polyimide. While the preferred embodiment uses the optical backplane 12, it will be understood by those skilled in the art that in its broadest sense my invention contemplates the use of any substrate that will perform the required functions of the optical backplane 12.

The optical fiber 14 may be made of polydimethyl siloxane (PDMS) or other suitable silicones. The core 14a of the optical fiber 14 could be solid or in gel form, the latter requiring that the cladding 14b have the appropriate index of refraction. Other suitable materials for the optical fiber 14 include aerogels and xerogels developed by the Lawrence Livermore National Laboratory operated by the Regents of the University of California. The optical fiber 14, whether solid or in gel form, must have the transparency or optical transmissiveness required for data communications. The refractive index of the conformal material used for the core versus that of the conformal material used for the cladding must be selected to provide for substantially total internal reflection as with any optical fiber.

The rigid pin 16 may be made of traditional optically transmissive materials having indices of refraction selected to provide substantially total internal reflection such as glass, quartz, or plastic optical fiber (POF) such as polymethyl methacrylate acrylic (PMMA), perfluorinated polymer (CYTOP), polyimide, polyarylene ether, and polyesterimide. The optical losses associated with POF are tolerable in this application because of the very short length of the pin 16. The use of a pin 16 made of POF also greatly simplifies connection to a POF fiber of ten meters or less in length for short haul data communications in an office environment where the losses associated with POF to not unduly hinder system performance. Where the pin 16 is made of POF the beveled terminal end 16a can be formed simply by slicing POF thereby eliminating the need for polishing.

Figure 2:
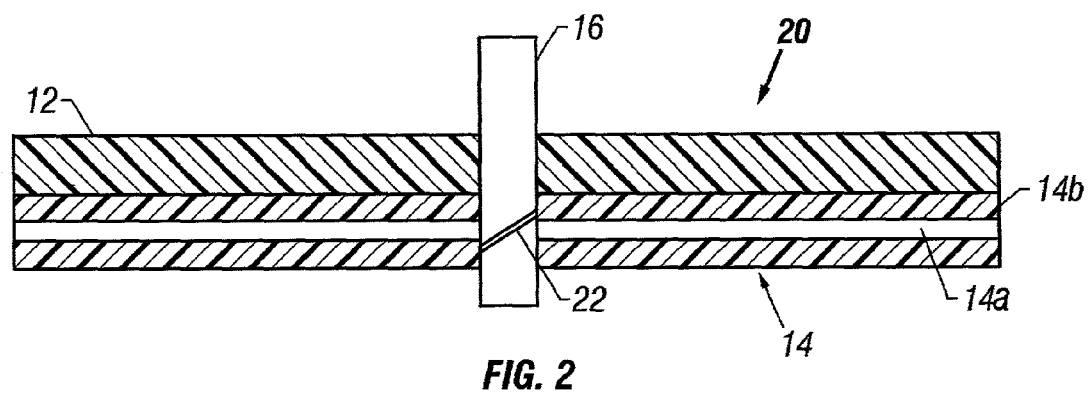
FIG. 2 is a diagrammatic illustration of a second embodiment of the present invention.

Referring to FIG. 2, a second embodiment 20 is similar to the first embodiment 10 except that the former includes a beam splitter 22 in lieu of the polished beveled terminal end 16a. The beam splitter 22 may comprise, for example, a semi-silvered mirror. The beam splitter 22 splits the light signal from the optical pin 16 so that a first portion of a light signal will be conveyed to the left in the optical fiber 14 and the second portion will be conveyed to the right. The receptacle 18 is not illustrated in FIG. 2.

Figure 3:
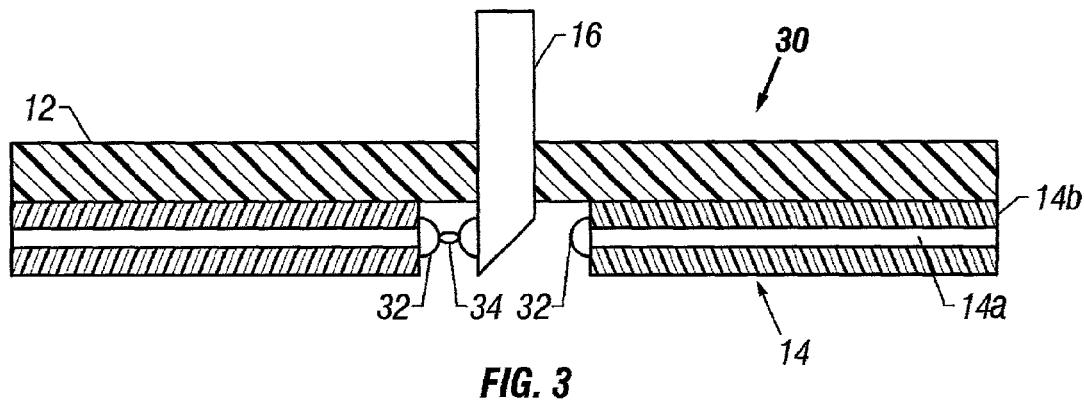
FIG. 3 is a diagrammatic illustration of a third embodiment of the present invention.

Referring to FIG. 3, in a third embodiment 30, a fixture 32 is inserted in the optical path between the core 14a and the optical pin 16. A bead 34 of optical index-matched liquid is held by surface tension between the pin 16 and a portion of the fixture 32 at the proper location. The core 14a attracts the bead 34 making the device self-aligning. Embodiments utilizing optical index matched liquids that are volatile at temperatures experienced by the device can additionally include a vapor resistant seal (not illustrated) to prevent evaporation of the bead 34. It is necessary to make the bead 34 narrow enough to get the required light containment. One suitable liquid for the bead 34 is siloxane. Mineral oil could also be used. Alternatively, a transparent UV curable adhesive material could be used to form the bead 34 in liquid form and then subsequently cured to anchor the bead 34 into position. A beam splitter (not illustrated) could also be added to this embodiment to enable tapped and through signals as in the FIG. 2 embodiment.

Figure 4:
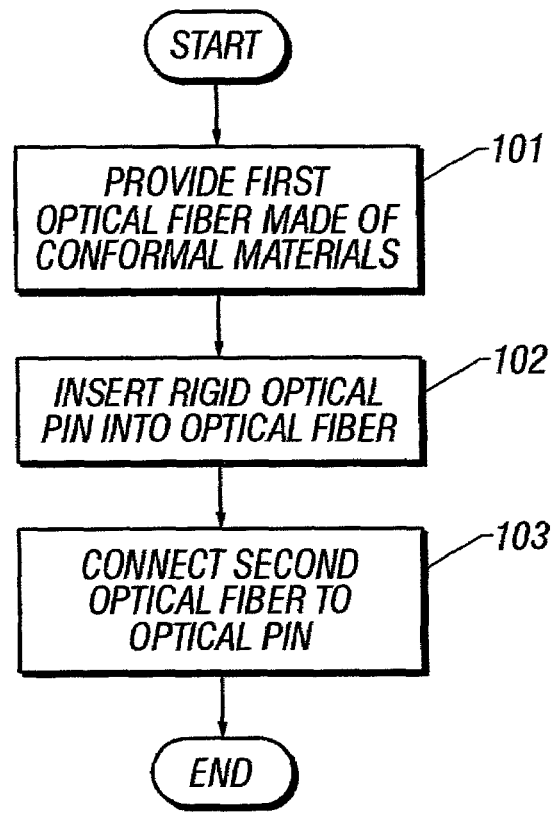
FIG. 4 is a flow chart of a method of providing a fiber optic interconnect.

The present invention also provides a novel method of providing a fiber optic interconnect. Referring to FIG. 4, the initial step 101 of the method involves providing the optical fiber with a core and a cladding made of conformal materials having indices of refraction selected to provide substantially total internal reflection. The next step 102 of the method involves inserting the terminal end of a rigid optical pin into the optical fiber so that a longitudinal axis of the pin extends substantially transverse to a longitudinal axis of the optical fiber, the pin being made of optically transmissive materials having indices of refraction selected to provide substantially total internal reflection so that a gap-less interface is formed between the optical fiber and the optical pin. The penetration depth is controlled to provide an optical waveguide connection. The next step 103 of the method involves connecting a second optical fiber (not illustrated) to a rearward end of the optical pin in the conventional manner.

Figure 5:
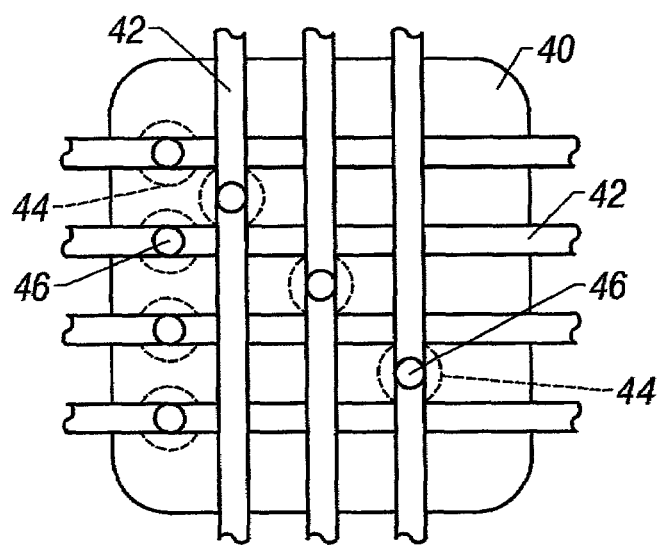
FIG. 5 is a schematic plan view of an alternate embodiment of a self-aligning optical interconnect.

While several embodiments of a self-aligning optical interconnect utilizing conformal materials have been described, it will be understood by those skilled in the art that the present invention may be modified in arrangement and detail. For example, a backplane 40 (FIG. 5) could support a number of parallel rows and columns of optical fibers 42 to provide a general purpose optical interconnect. The fibers 40 and receptacles 44 could be arranged in a very specific pattern customized for interconnecting various optical components to form a particular optical module, analogous to the manner in which Copper traces and through holes are formed on custom printed circuit boards for particular applications. The core and cladding of the optical fibers 42 can be made of materials that provide a single discrete or step change in the index of refraction or there could be a gradient of refractive indices therebetween. The optical pins 46 need not extend perpendicular to the optical fibers 42 but could extend at an angle so long as the optical pins 46 traverse the core of each optical fiber 42. The optical fibers 14 need not be used as their function could be served by any optical waveguide such as a trench in a substrate filled with the appropriate conformal materials. The present invention could be adapted to known optical integrated circuit structure. Therefore, the protection afforded the present invention should only be limited in accordance with the following claims.

What is claimed is:

1. A self-aligning optical interconnect, comprising:
   a substrate;
   at least one optical waveguide extending across the substrate, the optical waveguide having a core and a cladding made of conformal materials having indicies of refraction selected to provide substantially total internal reflection of light transmitted within the core;
   at least one optical pin made of substantially rigid optically transmissive materials; and
   at least one receptacle in the substrate for removably receiving and holding the optical pin to allow a terminal end of the pin to penetrate the core of the optical waveguide to establish an optical path between the core and the pin.

2. The interconnect of claim 1 wherein the optical pin has a beveled terminal end.

3. The interconnect of claim 1 and further comprising a beam splitter associated with the optical pin for conveying a portion of a light signal between the optical waveguide and the optical pin.

4. The interconnect of claim 1 wherein the optical waveguide is an optical fiber.

5. The interconnect of claim 1 wherein the optical waveguide is made of an optically transmissive gel material.

6. The interconnect of claim 1 and further comprising a fixture inserted in the optical path and a bead of index-matched liquid inserted between the pin and the fixture.

7. The interconnect of claim 1 wherein the optical pin is formed with a collar to control a penetration depth of the optical pin into the optical waveguide.

8. The interconnect of claim 1 wherein the receptacle is a sleeve mounted in the substrate.

9. The interconnect of claim 1 wherein the conformal materials are selected from the group consisting of silicones, polydimethyl siloxane, aerogel and xerogel.

10. The interconnect of claim 1 wherein the optical pin is made of a material selected from the group consisting of glass, quartz, and plastic optical fiber (POF).

11. A method of providing an optical interconnect, the method comprising:
    providing a rigid pin made of optically-transmissive materials having indices of refraction that provide substantially total internal reflection, the rigid pin including a terminal end and having a longitudinal axis;
    providing an optical waveguide including a core and a cladding made of conformal materials having indices of refraction that provide substantially total internal reflection, the optical waveguide having a longitudinal axis; and
    inserting the terminal end of the rigid pin into the optical waveguide with the longitudinal axis of the rigid pin substantially orthogonal to the longitudinal axis of the optical waveguide to form a gap-less optical interface between the optical waveguide and the rigid pin.

12. The method of claim 11 wherein the optical pin has a beveled terminal end which is inserted into the optical waveguide.

13. The method of claim 11 wherein the optical pin has a beam splitter adjacent the terminal end.

14. The method of claim 11 and further comprising the step of forming a bead of optically transmissive liquid between the optical pin and the optical waveguide.

15. The method of claim 11 wherein the optical waveguide is an optical fiber.

16. The method of claim 15 and further comprising the step of connecting a second optical fiber to a rearward end of the optical pin.

17. The method of claim 11 wherein the optical fiber is made of plastic optical fiber (POF).

18. The method of claim 11 and further comprising the step of providing a substrate that supports the optical waveguide.

19. The method of claim 11 wherein the conformal materials are selected from the group consisting of silicones, polydimethyl siloxane, aerogel and xerogel.

20. A self-aligning optical interconnect, comprising:
    an optical backplane;
    a plurality of optical fibers extending across the optical backplane, the optical fibers having cores and claddings made of conformal materials selected from the group consisting of silicones, polydimethyl siloxane, aerogel and xerogel and having indicies of refraction selected to provide substantially total internal reflection of light transmitted with the cores;
    a plurality of optical pins made of substantially rigid optically transmissive materials, the optical pins each having a beveled terminal end; and
    a plurality of receptacles in the optical backplane for each removably receiving and holding a corresponding one of the optical pins to allow the beveled terminal ends of the pins to penetrate the cores of the optical fibers to establish optical paths between the cores and the pins.

21. A method of providing an optical interconnect, the method comprising:

providing a rigid pin made of optically-transmissive materials having indices of refraction that provide substantially total internal reflection, the rigid pin including a terminal end and having a longitudinal axis;

providing an optical waveguide including a core and a cladding made of conformal materials having indices of refraction that provide substantially total internal reflection, the optical waveguide having a longitudinal axis; and inserting the terminal end of the rigid pin into the optical waveguide with the longitudinal axis of the rigid pin extending at a pre-determined angle with respect to the longitudinal axis of the optical waveguide to form a gap-less optical interface between the optical waveguide and the rigid pin.

* * * * *